(12) United States Patent
Rabinovich et al.

(10) Patent No.: US 7,359,800 B2
(45) Date of Patent: Apr. 15, 2008

(54) DETERMINATION OF FRACTURE ORIENTATION AND LENGTH USING MULTI-COMPONENT AND MULTI-ARRAY INDUCTION DATA

(75) Inventors: Michael B. Rabinovich, Houston, TX (US); Bill H. Corley, Conroe, TX (US); Gulamabbas Merchant, Houston, TX (US); Tsili Wang, Katy, TX (US); Edwinus Nicolaas Maria Quint, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 9 days.

(21) Appl. No.: 11/125,530

(22) Filed: May 10, 2005

(65) Prior Publication Data

US 2005/0256645 A1    Nov. 17, 2005

Related U.S. Application Data

(60) Provisional application No. 60/569,889, filed on May 11, 2004.

(51) Int. Cl.
    *G01V 3/18* (2006.01)

(52) U.S. Cl. ............................................. 702/7; 702/11

(58) Field of Classification Search .................. 702/7, 702/10–13
    See application file for complete search history.

(56) References Cited

U.S. PATENT DOCUMENTS

| 4,831,600 | A | 5/1989 | Hornby et al. ............... 367/31 |
| 5,243,521 | A | 9/1993 | Luthi .......................... 364/422 |
| 5,616,840 | A | 4/1997 | Tang ......................... 73/152.05 |
| 6,466,872 | B1 | 10/2002 | Kriegshauser et al. ......... 702/7 |
| 6,925,031 | B2 * | 8/2005 | Kriegshauser et al. ........ 367/25 |
| 7,043,370 | B2 * | 5/2006 | Yu et al. ........................ 702/7 |
| 2002/0059028 | A1 | 5/2002 | Rozak ............................ 702/7 |
| 2005/0065730 | A1 | 3/2005 | Sinha ............................. 702/7 |

* cited by examiner

*Primary Examiner*—Donald E McElheny, Jr.
(74) *Attorney, Agent, or Firm*—Madan, Mossman & Sriram, P.C.

(57) ABSTRACT

Measurements made by multiarray and multicomponent induction resistivity measurements in a borehole are used for determining the orientation and length of fractures in an earth formation when the fractures have a fluid with a resistivity different from that of the earth formation. The apparatus and method may also be used in anisotropic earth formations where the vertical and horizontal resistivities are different.

35 Claims, 12 Drawing Sheets

DETERMINATION OF FRACTURE ORIENTATION AND LENGTH USING MULTI-COMPONENT AND MULTI-ARRAY INDUCTION DATA

CROSS-REFERENCES TO RELATED APPLICATIONS

This applications claims priority from U.S. Provisional Patent Application Ser. No. 60/569, 889 filed on May 11, 2004.

BACKGROUND OF THE INVENTION

1. Field of the Invention

The invention is related generally to the use of resistivity measurements for identification of fracturing and determination of the extent of fracturing in earth formations.

2. Background of the Art

In exploration for hydrocarbons, a significant number of reservoirs involve fractured reservoirs. Broadly speaking, there are two types of situations encountered in development of such reservoirs. The first case involves a rock matrix that has a significant porosity so that the hydrocarbons occur within the pore spaces of the rock matrix; however, the permeability of the matrix itself is very low, making development of such reservoirs uneconomical. In such rocks, permeability resulting from fracturing of the rock matrix may make commercial development economical. A second case involves reservoirs in which the only significant porosity in the reservoir is due to fracturing of the rock matrix. Examples of reservoirs that produce from fractured granite are the Playa Del Rey field and the Wilmington field in California, and the Hugoton field in Kansas. It is thus important to be able to identify the extent of fracturing in earth formations.

Fractures observed in boreholes hold important clues for the development of a field. Open natural fractures may enhance productivity in the case of depletion drive or lead to early water breakthrough under a water drive or strong aquifer scenario. However, cemented fractures may form barriers to flow. Therefore it is important to know the orientation and density of the natural fractures to allow for optimized field development. Drilling induced fractures can also be observed in a wellbore. This information can be used to determine the direction in which hydraulic fractures employed in the development of tight reservoirs will propagate. The actual hydraulic fractures can be monitored with micro-seismic, which is relatively expensive and requires a monitoring well close by.

U.S. Pat. No. 4,831,600 to Hornby et al. teaches a method for determining the relative depth and width of fractures which intersect a borehole. Specifically, a sonic logging sonde having an acoustic source and at least one acoustic detector is deployed in the borehole. The source generates a tube wave, commonly referred to as a Stoneley wave, which propagates through the borehole. Based on the travel time and energy content of the Stoneley wave produced by the acoustic source as received by the detector, the depth and/or width of a fracture which has intersected the borehole can be determined. U.S. Pat. No. 5,616,840 to Tang teaches a method for modeling fracture zones in the sidewall of a borehole and for estimating the hydraulic conductivity thereof. The method first separates Stoneley wavefields into a directly-transmitted wavefield and a one-way (i.e. down-going) reflected wavefield from which the depth configuration may be determined. The separated wavefields are corrected for the effects of borehole irregularities due to such effects as washouts and the like by numerically modeling Stoneley wave propagation using caliper and slowness measurements. The hydraulic conductivity is estimated from parameters derived from synthetic and measured Stoneley wave data across the fracture zone in combination with measurements of the borehole radius. The propagation of hydraulic fractures can be monitored with micro-seismic, which is relatively expensive and requires a monitoring well close by.

The methods of Hornby et al. and of Tang are limited in their ability to provide an estimate of the extent (distance from the borehole into the formation) of the fractures. U.S. Pat. No. 5,243,521 to Luthi teaches the use of a formation microscanner for fracture analysis. The formation microscanner comprises a multi-electrode pad arrangement for providing a resistivity image. The Luthi method requires manual selection of the fractures to be examined in order to exclude the effects of drilling induced micro-fractures on the aperture calculation. The Luthi method cannot provide results in real time in the field.

Shallow resistivity imaging tools have azimuthal sensitivity and can thus identify features such as fractures at the borehole wall. However, they lack the ability to see deeper into the formation, something that is essential to delineate the radial extent of fractures. Prior art deep resistivity measurements, on the other hand, generally do not have azimuthal sensitivity. For galvanic measurements, the 360° design of the current and measurement electrodes provided an axial symmetric tool response. The same is true for conventional induction tools with vertical transmitter and receiver coils.

U.S. Pat. No. 6,466,872 to Kriegshauser et al. having the same assignee as the present application and the contents of which are fully incorporated herein by reference discloses use of a multi-component logging tool for determination of anisotropic resistivity parameters of a laminated reservoir. As would be known to those versed in the art, such a laminated reservoir that has layers of different resistivities exhibits transverse isotropy even if the layers themselves are isotropic. Such a multicomponent logging tool has azimuthal sensitivity. The present invention is based on the recognition that a multicomponent logging tool such as that described in Kriegshauser could have the ability to delineate the extent of fracturing, particularly vertical fracturing, in earth formations.

SUMMARY OF THE INVENTION

The present invention is an apparatus for and a method of evaluating an earth formation wherein the earth formation has a fluid filled fracture. The fluid has a different resistivity than the earth formation. Measurements are made by a first logging tool conveyed in a borehole in the earth formation. The first logging tool has a plurality of transmitters and a plurality of receivers. Each of the plurality of transmitters and plurality of receivers has an axis parallel to an axis of the first logging tool. A plurality of transmitter-receiver spacings may be provided. A second set of resistivity measurements with a second logging tool conveyed into the borehole in the earth formation. The second logging tool is a multicomponent tool having a plurality of transmitters and a plurality of receivers, at least one of the transmitters and the receivers has an axis inclined to an axis of the second logging tool. A processor is used for processing the measurements made by the first and second logging tools to determine a length of the fracture, and/or width of the fracture.

A resistivity image of the borehole wall may be obtained using a resistivity imaging tool or an acoustic imaging tool. This provides information about the fracture orientation. The length of the fracture may be determined by comparing measurements made by the first logging tool at two different transmitter—receiver distances. The measurements made by the first logging tool may be focused by using a processor. The resistivity of the fluid in the borehole may be obtained using a suitable instrument.

The orientation of the fracture may be determined by the processor using resistivity measurements made by the second logging tool. A skin effect correction may be applied. One or more of a $H_{xx}$ component, a $H_{yy}$ component, and a $H_{xy}$ component may be used. Orientation of the logging tools may be obtained using one or more of a magnetometer, an accelerometer, and a gyroscope. The apparatus and the method may be used for vertical or horizontal fractures.

Another embodiment of the invention is a method of and an apparatus for analyzing a fractured anisotropic earth formation in which the vertical and horizontal resisitivities of the unfractured formation may be different. Multicomponent resistivity measurements are made and from the multicomponent measurements, the vertical and horizontal resistivities of the formation are determined even in the presence of the fluid filled fracture. Such a determination is possible if the measurements are multifrequency measurements and a frequency focusing applied. As an alternative to multifrequency focusing, the vertical and horizontal resistivities may be obtained by suitable selection of the components to be analyzed. Specifically, resistivity measurements with a current flow parallel to the fracture plane (either by direct measurements or by rotation of coordinates) may be used. An orientation sensor may be used to provide the orientation information for coordinate rotation.

BRIEF DESCRIPTION OF THE FIGURES

The present invention is best understood with reference to the following figures in which like numbers refer to like components and in which.

DETAILED DESCRIPTION OF THE INVENTION

Figure 1:
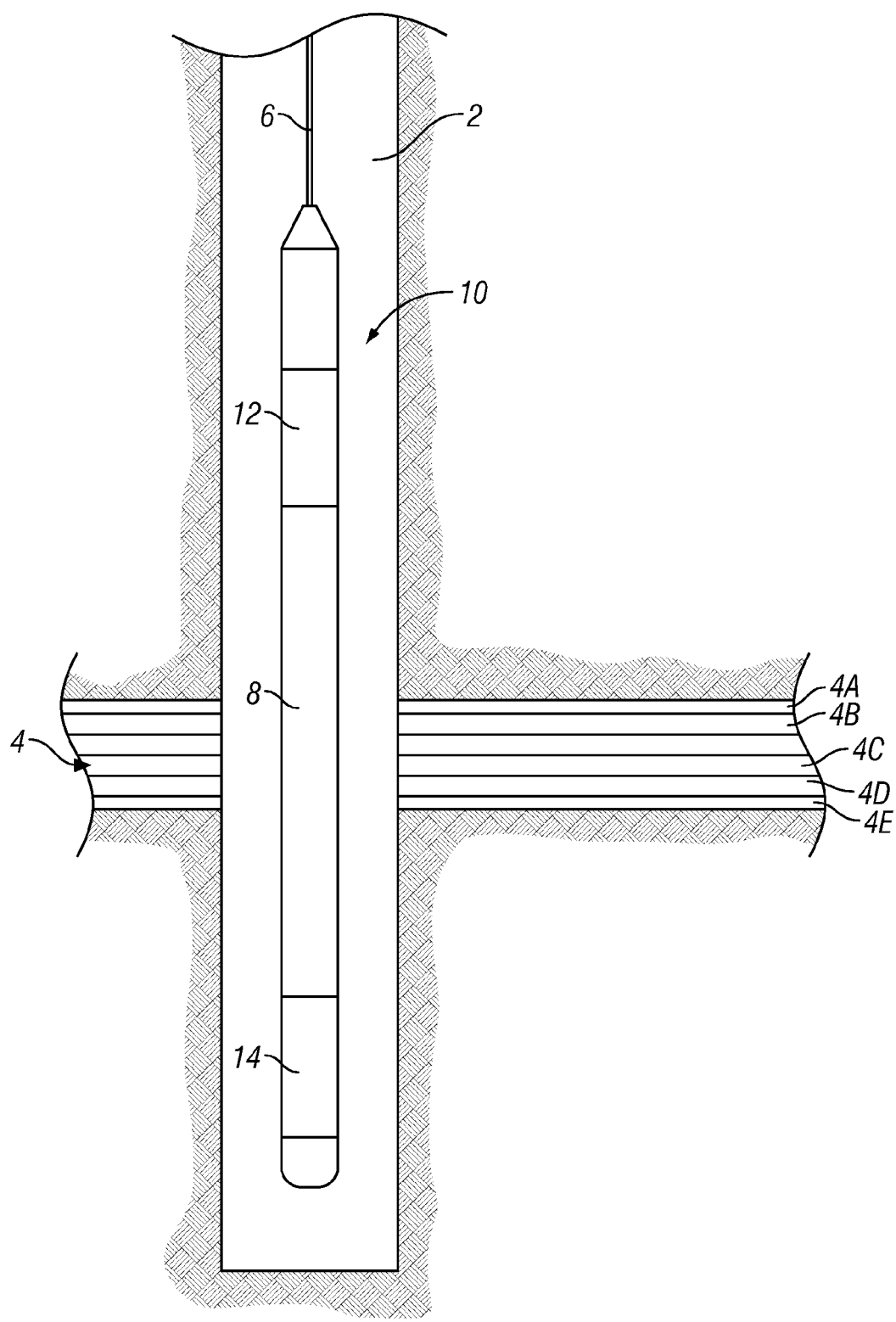
FIG. 1 (prior art) illustrates an induction instrument disposed in a wellbore penetrating earth formations.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by use of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8. A processor for controlling the operation of the tool and processing acquired data may be part of the electronics unit. Alternatively, some or all of the processing and control may be done by a surface processor.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
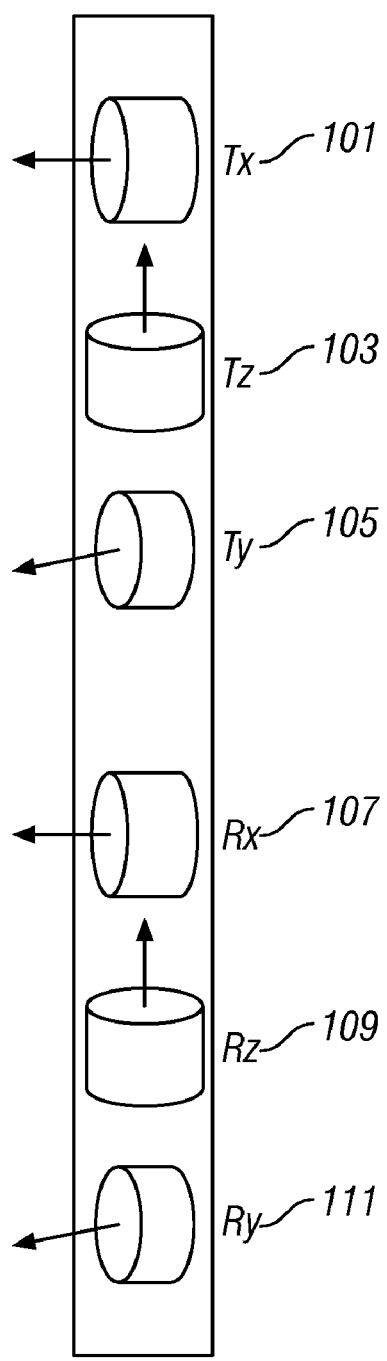
FIG. 2 (prior art) illustrates the arrangement of transmitter and receiver coils in multicomponent induction logging tool marketed under the name 3DExplorer™.

Referring to FIG. 2, the configuration of transmitter and receiver coils in the 3DExplorer™ multicomponent induction logging instrument of Baker Hughes is shown. This is for exemplary purposes only and any multicomponent tool may be used. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. In one mode of operation of the tool, the $H_{xx}$, $H_{yy}$, $H_{zz}$, $H_{xy}$, and $H_{xz}$ components are measured, though other components may also be used. It should be noted that the method of the present invention may also be used with non-orthogonal configurations of transmitters and receivers. Well known coordinate rotation methods may be used with such non-orthogonal measurements to rotate them into the desired orientation. For the purposes of the present invention, all such measurements (orthogonal and non-orthognal) will be referred to as multicomponent measurements.

In addition, the method of the present invention also uses multiarray induction logging data. Such a multiarray logging tool is disclosed, for example, in U.S. Pat. No. 5,666,057 to Beard et al. having the same assignee as the present invention and the contents of which are incorporated herein by reference. Such an induction instrument includes transmitters and receivers with coils having axes parallel to the tool axis, multiple source-receiver spacings, and may operate at multiple frequencies. A multiarray induction tool provides different depths of investigation of the earth formation. The HDIL tool disclosed by Beard is for exemplary purposes only and any multiarray induction tool may be used. The HDIL tool and the 3DEX tool may be on the same logging string. Alternatively, measurements from the HDIL and the 3DEX tool may be obtained in different logging runs. An orientation sensor, such as a magnetometer, is provided on the instruments at a suitable location.

The present invention includes modeling of responses from 3-D objects as well as inversion of measurements indicative of properties of 3-D objects. An important aspect of modeling and inversion is to ensure the accuracy of the modeling. The accuracy of the modeling and inversion methods for 3-D objects in an earth formation is discussed first.

In this study of the invention, the inventors used two different 3-D modeling codes. These codes are based on completely different numerical approaches (one is finite-difference and the other one is finite-element). Consequently, they differ in speed, discretization method, convergence rate, model approximation, etc. Although there were several reasons for using two codes, the most important one was the comparison with each other to ensure the consistency of the results. After establishing the validity and accuracy of the numerical solution for each code, the inventors selected and used the one that provided the best approximation and performance for a particular model. Below is a brief summary for each algorithm and then show an example of the comparison of the results in one of the models used in the study.

INDANI (developed by Baker Atlas Inc.) is a full 3-D finite-difference algorithm for modeling induction tool responses (Wang and Fang, 2001). The method uses a conventional, staggered Yee grid to discretize a fully anisotropic medium. The complex system of equations is solved using the spectral Lanczos decomposition method for the magnetic field. With this method, the responses at multiple frequencies can be solved simultaneously. To accurately model a deviated well and features near the transmitters and receivers, the finite-difference grid is attached to the tool with the z-axis coincident with the tool axis. A typical grid contains 70×70×100 cells in the x-, y-, and z-directions, respectively. The minimum grid size is 0.125 in. Larger grid cells are used for the far zones. Special efforts were made in modeling nonconformal boundaries by using material averaging.

The second code for simulation of induction tool responses in a fractured medium is called FEMCYL3D (also developed by Baker Atlas). It is a full 3-D code for the numerical solution of the Maxwell equations. The model is discretized with the finite-element method on a cylindrical grid with the z-axis coinciding with the tool axis. The Nédélec edge basic functions of the lowest order are employed. The resulting algebraic system is solved by the preconditioned full GMRES ("generalized minimum residual") iterative method. The preconditioning operator corresponds to the same medium but without fractures. The simulations presented here used a grid with 37×256×58 nodes. The number of iterations needed to reach a prescribed precision depends on the model resistivity contrast, the fracture length, and the transmitter orientation. The required CPU time on a SUN workstation for a single calculation (one frequency) can vary from several minutes to several hours.

Figure 3:
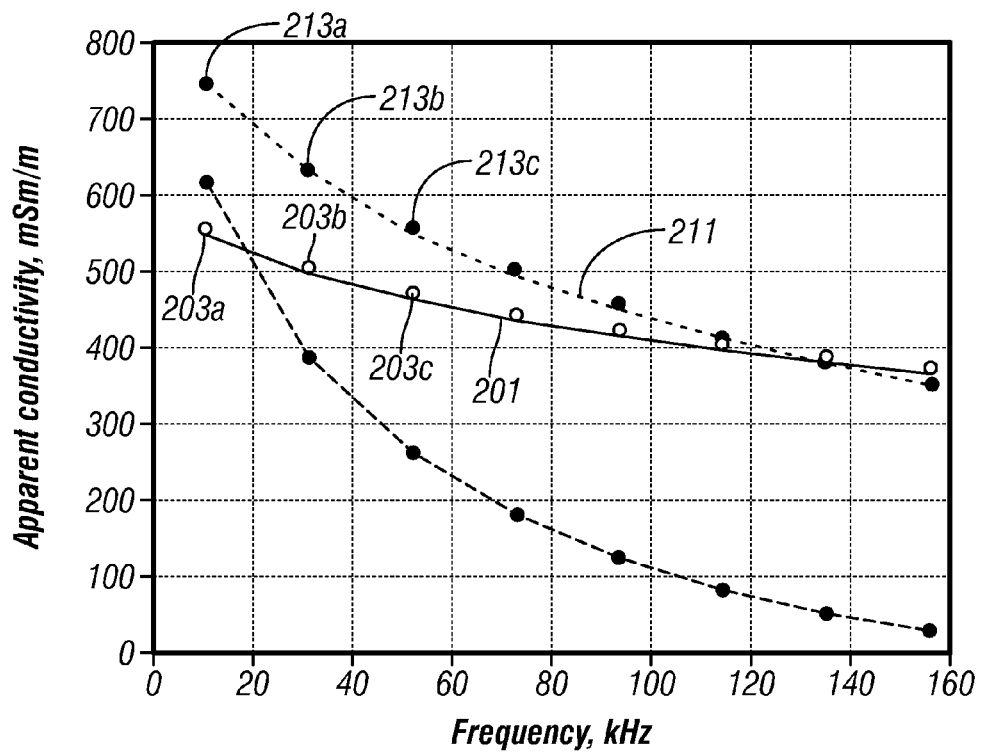
FIG. 3 illustrates a comparison of results from finite difference and finite element modeling.

FIG. 3 is a comparison of the modeling results for the two algorithms for a vertical resistive fracture with a length of 2 ft and aperture of 1 in. The borehole is 8.5 in., resistivity of the mud and the fracture is 1000 Ohm-m, and resistivity of the formation is 1 Ohm-m. The agreement between INDANI (dots) and FEMCYL3D (solid lines) is good. Curve 211 and points 213*a*, 213*b*, 213*c* correspond to subarray 4 while curve 201 and points 203*a*, 203*b*, 203*c* correspond to subarray 2. As would be known to those versed in the art, resistive fractures commonly arise when the fracture is filled in with a resistive cement such as calcite.

3-D objects in the formation, even as simple as horizontal or vertical fractures, may produce nontrivial, sometimes even counter-intuitive, responses in multi-component and multi-array induction tools. As part of the invention, different models were considered for numerical simulation. The first simulation is of multi-component and multi-array tool responses in typical situations where there is a resistivity contrast between formation and fractures and some effect on either or both tools may be expected. It is believed that the simulated tool responses would be very helpful for understanding (at least qualitatively) where, when, and how the fractures can manifest themselves in modern resistivity logs. The tool responses were modeled quantitatively to interpret the field logs discussed in this document.

The results of the numerical simulation are presented in the form of logs. For the multi-array HDIL tool, six focused curves with a different depth of investigation: 10", 20", 30", 40", 60" and 90" (25.4 cm, 50.8 cm. 76.2 cm, 1.016 m, 1.524 m and 2.286 m) are available. For the multi-component 3DEX tool the results in the form of the skin-effect corrected (SEC) and multi-frequency focused (MFF) curves for five measured components XX, YY, ZZ, XY, and XZ (XZ is equal to zero in all cases due to the model symmetry) are presented. Here, the first letter stands for the orientation of the transmitter and the second for the orientation of the receiver. Multifrequency focusing is disclosed, for example, in U.S. Pat. No. 5,703,773 to Tabarovsky et al. having the same assignee as the present invention and the contents of which are fully incorporated herein by reference.

Tool responses for a model including a vertical borehole with a diameter of 8.5" were simulated. Both oil-based mud (OBM) and water based mud (WBM) were simulated. The formation and mud resistivities of the models considered are listed in the table below. In all cases we assume that the fractures are filled with borehole mud and have the resistivity of the borehole fluid.

TABLE I

Models used for simulation

| Formation resistivity ($\Omega$-m) | Mud and fracture resistivity ($\Omega$-m) |
| --- | --- |
| Conductive Rh = 1.6 $\lambda$ = 1, 2, 4 | Resistive Rm = 10000 |
| Resistive Rh = 20 $\lambda$ = 1, 2, 4 | Conductive Rm = 0.05 |

TABLE I-continued

Models used for simulation

Figure 4:
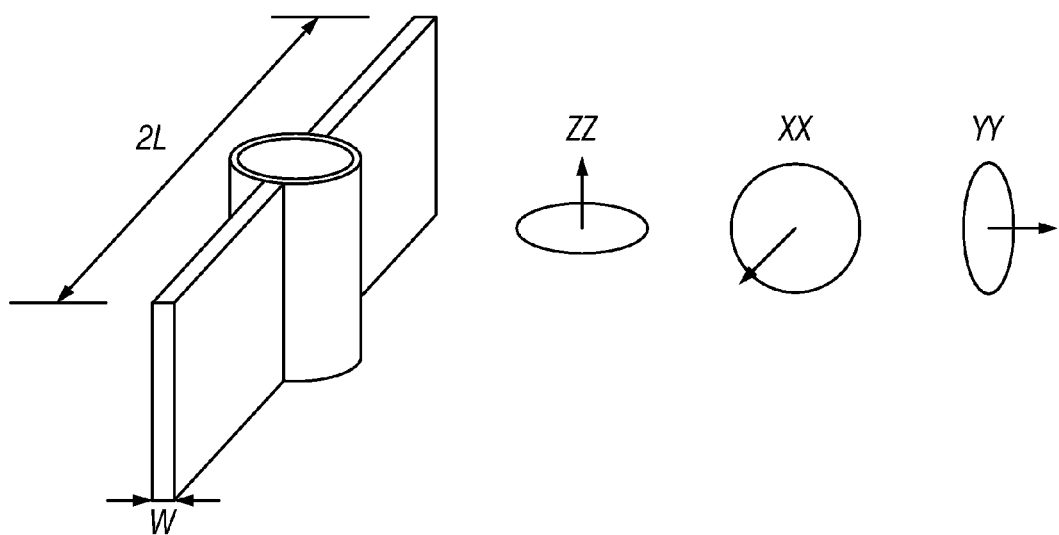
FIG. 4 illustrates the geometry of the fracture in the simulation.

| Formation resistivity (Ω-m) | Mud and fracture resistivity (Ω-m) |
|---|---|
| Resistive Rh = 20 λ = 1 | Conductive Rm = 1.0 |

λ is the resistivity anisotropy ($R_v/R_h$). Both horizontal and vertical fractures were simulated. Fracture lengths (radial extent into the formation) of 2 ft, 10 ft, and infinite length were simulated. For the resistive vertical fracture fracture lengths from 1 to 10 ft and infinity were simulated. Fractures with the finite length represent the drilling induced fractures, while the model with an infinite fracture length may represent natural fractures. The fracture aperture was taken as 0.25 in. Only a single fracture was simulated to reduce the number of cases and to simplify the numerical models without compromising the accuracy of the geological model. Because the resolution of our sensors is significantly lower then the aperture of any single fracture, it was assumed that the effect of several thin fractures is close to the effect of a single fracture with an equivalent aperture equal to the sum of apertures of all fractures. The fracture geometry is depicted in FIG. 4.

The vertical fractures are considered to be infinitely long in the z-direction (along the borehole) and that the fracture assumed to lie in the XZ plane (rotation angle RB=0). The orientation of the fracture and main components of the multi-component tool at a zero rotation angle (RB=0) is presented in FIG. 4. In the subsequent simulations, the multi-component tool was rotated from 0 to 360° (the rotation angle curve is always depicted in the left track of each plot) to illustrate its azimuthal sensitivity.

Before starting an extensive numerical simulation for resistive fractures, the effects of the fracture resistivity and aperture were studied. In modeling a resistive fracture it is desirable to simulate true oil-based mud fluid with zero conductivity. At the same time, general 3-D modeling codes may have some problems with convergence and require special efforts for grid discretization when the resistivity contrast becomes too large.

Figure 5:
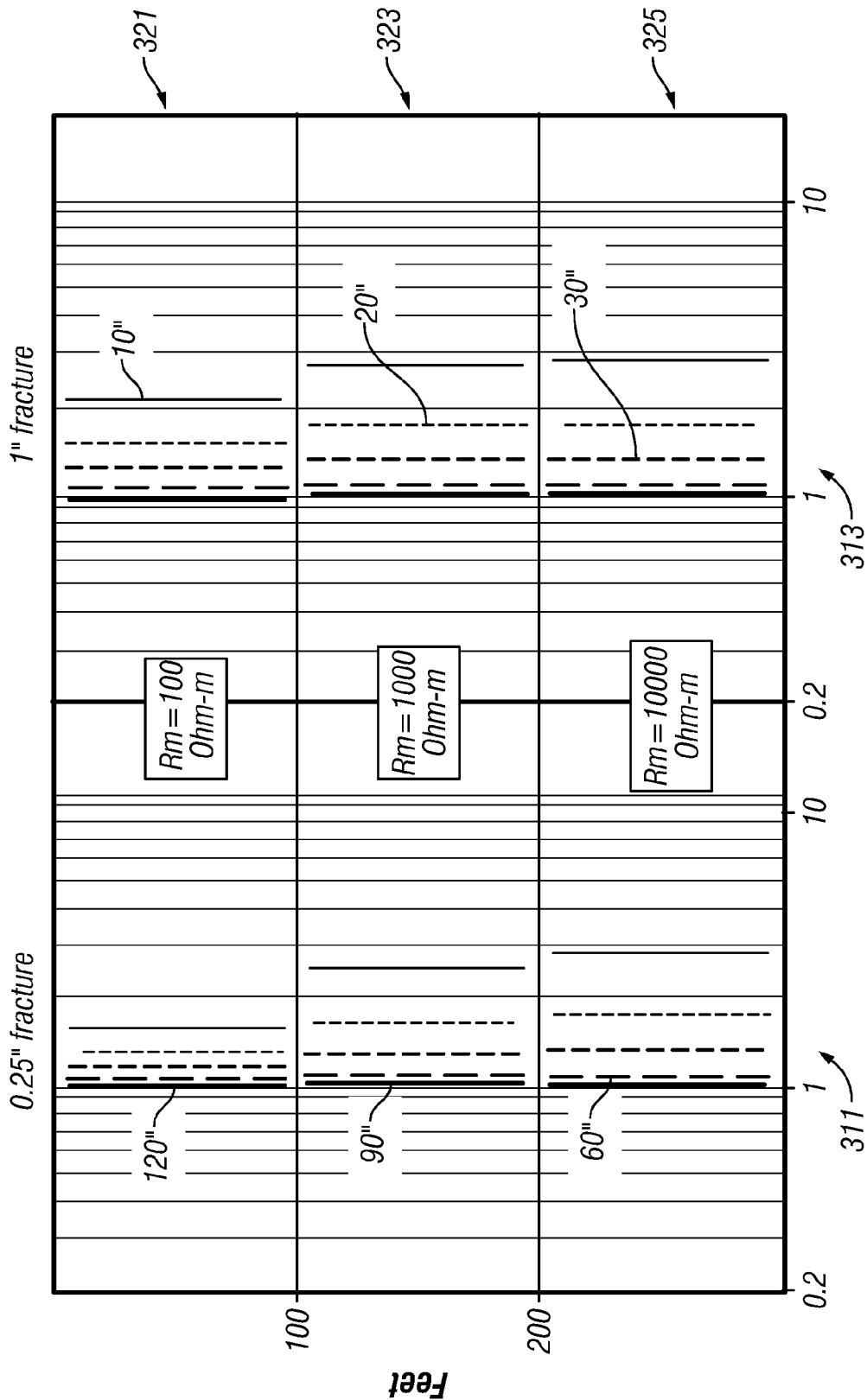
FIG. 5 illustrates the effects of fracture resistivity and apperture on the HDIL response.

In FIG. 5 HDIL responses are presented for three different fracture resistivities: 100, 1000, and 10000 Ω-m (depicted in 321, 323 and 325) for two different fracture apertures: 0.25" and 1" shown in panels 311 and 313 respectively. The radius of the fracture is 2 ft. It is observed that the results converge when the resistance of the fracture (product of the fracture resistivity and aperture) increases. The different curves correspond to different transmitter-receiver spacings. It is seen, for example, that for both fracture apertures an increase from 100 to 1000 Ω-m significantly changes the shallow curves, especially the 10" curve. Also, it is noted that for 100 Ω-m mud, the shallow responses are different for 0.25" and 1" fractures. At the same time, the increase from 1000 to 10000 Ω-m changes almost nothing, and for a 10000 Ω-m fracture 0.25" and 1" responses are practically equal. As a result of this exercise, it can be concluded that the 0.25" fracture with the mud resistivity of 10000 Ω-m can quite accurately represent the non-conductive mud. In the following simulations of the 3DEX and HDIL responses, these resistive fracture parameters were used.

Figure 6:
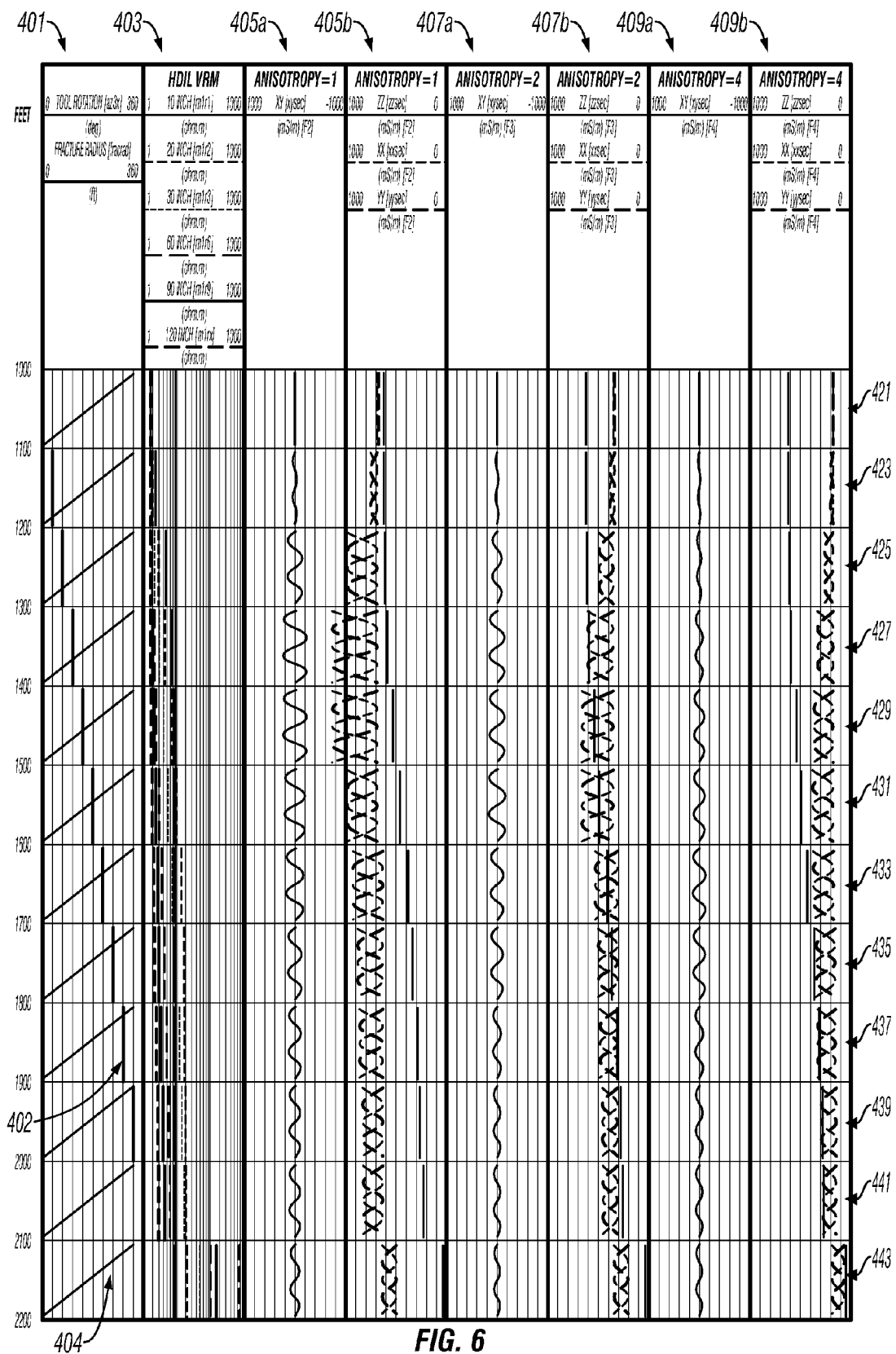
FIG. 6 illustrates simulation results for vertical resistive fractures of different length on HDIL and skin effect corrected (SEC) 3DEX measurements.

FIG. 6 depicts the results of numerical simulation for both HDIL (focused curves) and 3DEX (skin-effect corrected) curves. Presented are twelve different fracture radii—from 0 (no fracture) to 10 feet and infinite fracture (421, 423, 425, 427, 429, 431, 433, 435, 435, 437, 439, 441 and 443)—for 3 different vertical resistivities: with anisotropy ratios of 1, 2, and 4 (a total of 36 cases). The length of the fracture increases in the Z direction (presented in the track 401 by the discontinuous line 402). For each fracture radius 100 ft of data are generated where the tools rotate from 0 to 360 degrees. The tool rotation is depicted schematically by 404. The HDIL focused curves in track 403. In the next three pairs of tracks (405a-405b), (407a-407b) and (409a-409b), we depict 3DEX SEC curves for three anisotropy values (λ=1, 2 and 4 with two tracks for each). The first track in each pair is the XY component while the second track in each pair shows the ZZ, XX and YY components.

Several observations may be made on this figure. It is seen that the HDIL response is similar to that of resistive invasion—shallow focused curves read higher resistivity than the deep ones. This behavior of the focused curves is easy to explain: a shallow resistive fracture is an obstacle for the shallow induced currents that contribute mostly to the short subarrays. The induced currents with a large radius (that mostly contribute to the deep curves) are not affected at all or affected very little by shallow fractures. It is noted that a 120" depth of investigation curve does not change unless the length of the fracture becomes greater than 4 ft. Thus, if a borehole image log is available to identify the presence of a fracture, the fracture length may be determined from the focused HDIL measurements.

The 10" curve exhibits a peculiar behavior. Its resistivity reading keeps increasing with the fracture length until it reaches 4 ft. After that, the 10" curve reading is constant. An interpretation of this is that the induced currents that contribute to its reading are already interrupted by the fracture and two new current systems (one at each side of the fracture) dominate the shallow current distribution. While the 10" curve does not continue to change with the increase in fracture length, the deeper curve readings indicate a more resistive formation. For the 5-ft fracture, the reading of the 20" curve becomes larger than the 10-in. and the reading grows until the fracture become 8-ft long, when the 20" reading becomes constant, etc. It is observed that for the infinite fracture length, the sequence of the focused curves is reversed completely.

It is much more difficult to explain 3DEX results. The main components for the model with an anisotropy ratio λ=1 are examined first. In the absence of the fracture, the SEC ZZ component reads 620 mS/m, which is close to the true formation conductivity (the model has Rh=Rv=1.6 Ohm-m). The XX and YY components, which are equal in this model, read 675 mS/m, indicating that the borehole effect for XX and YY components in this model is about 55 mS/m. These results were expected because the borehole effect in the case of OBM is negligible in the conventional ZZ component and rather significant in the transversal XX and YY components.

One can see that the conventional ZZ component in the presence of fractures behaves very similar to an HDIL 90" focused curve. This agrees with the spacings and the depth of investigation of the ZZ array. At the same time the response of the transversal components in the presence of a fracture is surprising. To better understand this controversy, let us look at the responses for a 2-ft long fracture. The very first depth on the log corresponds to 360 or 0 degrees of the tool rotation. The orientation of the transversal components in this case is the following: the XX magnetic dipole lies in the plane of the fracture, while the YY dipole is perpendicular to the plane. This means that in the XX coil case induced currents in the formation cross the fracture, and for the YY dipole the currents flow parallel to the fracture plane. We know that if the induced currents are parallel to the very thin resistive layer, this layer does not affect the tool response. Consequently, at this depth the YY component is reading the same value as without a fracture. As we can notice, this is the case for any fracture length. Thus, processing of multicomponent measurements gives an indication of fracture length.

It is observed that the conductivity reading of the XX component at this depth (at zero rotation) is higher then the ZZ component and also higher then the XX component in the model with no fracture. This increase of apparent conductivity is counter-intuitive because in this case the currents cross a resistive layer, and we should expect the corresponding magnetic field to become smaller. An explanation is that for this tool configuration (3-coil arrays) and spacings, the fracture has a negative geometric factor. It is also confirmed in the conductive fracture case when the XX component reads a lower conductivity compared to the case with no fracture. Another way to explain this phenomenon is to say that the resistive fracture reduces the induced currents in the vicinity of the borehole, and that these currents, due to their orientation, contribute negatively to the total magnetic field in the 3-coil XX array. This is why reducing these currents leads to an increase in the XX conductivity reading. An alternative explanation of this effect based on a "smoke ring" is given in Wang et al., 2002.

When the tool rotates 90 degrees, XX and YY arrays and their readings switch places. Because the cross-component XY is a function of the principal XX and YY components (XX and YY at zero rotation) and rotation angle $\phi$:

$$H_{xy} = -(H_{xx}^P - H_{yy}^P)\sin(2\phi)/2, \quad (1)$$

there is perfect correlation between the XX, YY and XY components. As evident in FIG. 6, these three components possess excellent azimuthal sensitivity to the direction of the fracture.

As the tool rotates the responses of the measured components can be written as $$H_{xx} = H_{xx}^P \cos^2(\phi) + H_{yy}^P \sin^2(\phi), \quad (2)$$

$$H_{yy} = H_{xx}^P \sin^2(\phi) + H_{yy}^P \cos^2(\phi). \quad (3)$$

When the fracture plane is parallel to the X principal component, the principal component $H_{xx}^P > H_{yy}^P$. In such a case the maximum value of the measured $H_{xx}$ will occur when the X-direction of the tool is parallel to the fracture plane. The minimum will occur when the X-direction is perpendicular to the fracture plane. Similarly, the $H_{yy}$ component is maximum or minimum when the Y-direction of the tool points in the direction parallel or perpendicular to the fracture plane, respectively.

Eq. 1 shows that the minimum of $H_{xy}$ is obtained when the X-direction of the tool makes an angle of 45° from the fracture plane. The maximum is when the X-direction is at 135° from the fracture plane. However, in the situation when the tool does not rotate but has a fixed azimuth angle with respect to the fracture plane, its orientation can be obtained from the following formula:

$$\varphi = \frac{1}{2}\tan^{-1}\left(\frac{2H_{xy}}{H_{yy} - H_{xx}}\right). \quad (4)$$

The fracture plane can be obtained by counter-rotating the tool reference direction (i.e., X direction) through the angle $\phi$. However, there is an ambiguity of 90° because tan(2$\phi$) has the same value for $\phi=\phi_0$ and for $\phi=\phi_0+90°$. If the terms $H_{xy}$ and $H_{yy}-H_{xx}$ are both negative, the counter rotation is for $\phi=\phi_0$. If both are positive, then the counter-rotation is through $\phi=\phi_0 90°$.

The responses of the XX and YY components become smaller when resistivity anisotropy (ratios 2 and 4) is included in the model. The reduction in apparent conductivity compared to the no fracture case is almost proportional to the anisotropy ratio. It agrees with the well-known behavior of the SEC transversal components in thick anisotropic layers where they read the vertical resistivity of the formation.

Conventional wisdom suggests that the multi-array induction tool, as any induction tool with conventional z-oriented coils, is not sensitive to bi-axial anisotropy when there is no relative dip. This is not exactly the case in the model with the vertical resistive fracture: the multi-array induction tool becomes sensitive to anisotropy. For example, the ZZ response in models with a 5-ft fracture radius and 1, 2, and 4 anisotropy ratios (FIG. 6), shows that for $\lambda=1$ the ZZ value is 445 mS/m, for $\lambda=2$ the reading is 485 mS/m and for $\lambda=4$ it is 500 mS/m.

Figure 7:
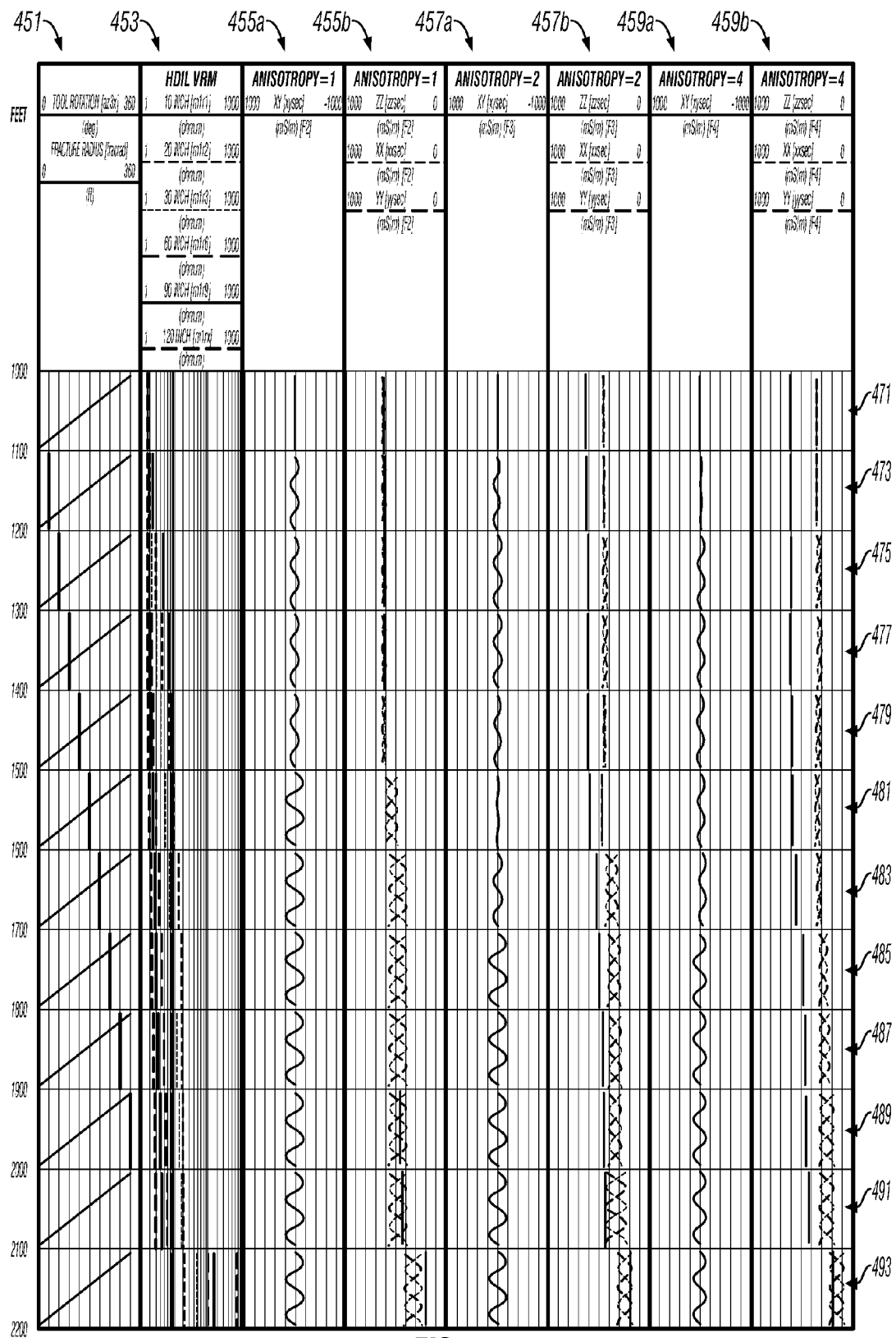
FIG. 7 illustrates simulation results for vertical resistive fractures of different length on HDIL and 3DEX (multifrequency focused) measurements.

FIG. 7 shows 3DEX multi-frequency focused (MFF) curves for the same models discussed above. In this plot, twelve different fracture radii are presented—from 0 (no fracture) to 10 feet and infinite fracture (471, 473, 475, 477, 479, 481, 483, 485, 487, 489, 491 and 493)—for 3 different vertical resistivities: with anisotropy ratios of 1, 2, and 4 (a total of 36 cases). The length of the fracture increases in the Z direction (presented in the track 451). For each fracture radius 100 ft of data were generated where the tools rotate from 0 to 360 degrees. The tool rotation is depicted schematically in track 451. The HDIL focused curves in track 453. In the next three pairs of tracks (455a-455b), (457a-457b) and (459a-459b), we depict 3DEX MFF curves for three anisotropy values ($\lambda=1$, 2 and 4 with two tracks for each). The first track in each pair is the XY component while the second track in each pair shows the ZZ, XX and YY components.

The following features of the MFF responses are noted. In the model without fractures the significant borehole effect (that is observed in the SEC transversal components XX and YY) is now eliminated—all the components are reading values close to the formation conductivity of 625 mS/m. Compare (455a with 403a, 455b with 405b, 457a with 407a, 457b with 407b, 459a with 409a, 459b with 409b, for the panels 471 and 421). In the models with shallow fractures (up to 4 ft) the effect of the fracture becomes negligible after the MFF transformation (particularly in the model with $\lambda=1$). Also, in the models with deeper fractures, their effect is considerably reduced in the MFF curves compared to the SEC curves. The situation is similar for the cases with anisotropy ratios 2 and 4. Due to the increased vertical resistivity, the responses of the transverse components XX and YY and, consequently, the cross-component XY are smaller—the MFF transformation drastically reduces the fracture effect. It is noted that this multi-frequency focusing behavior was expected and has been described previously in the literature (Yu et al., 2003). We also note that the resistive fracture manifests itself in the MFF response in a more natural way compared to the SEC curves because it reduces the apparent conductivity of the formation.

Based on the analysis presented above, the following points are noted. For vertical fracture parameters, the induction tool components that generate induced currents orthogonal to the fracture plane should be used. It was noted that the HDIL focused curves are sensitive to the fracture length. The 3DEX SEC responses are sensitive to both the fracture length and fracture orientation. On the other hand, for conventional Rh/Rv processing, we should use either the MFF curves or the components that generate currents parallel to the fracture plane. If the multi-component tool rotates, in the thick layer it will be the depth levels where the XX or YY components read minimum values and the XY component crosses zero. If the tool does not rotate, all three components (XX, YY, and XY) can be used to rotate the data to the required orientation.

Figure 8:
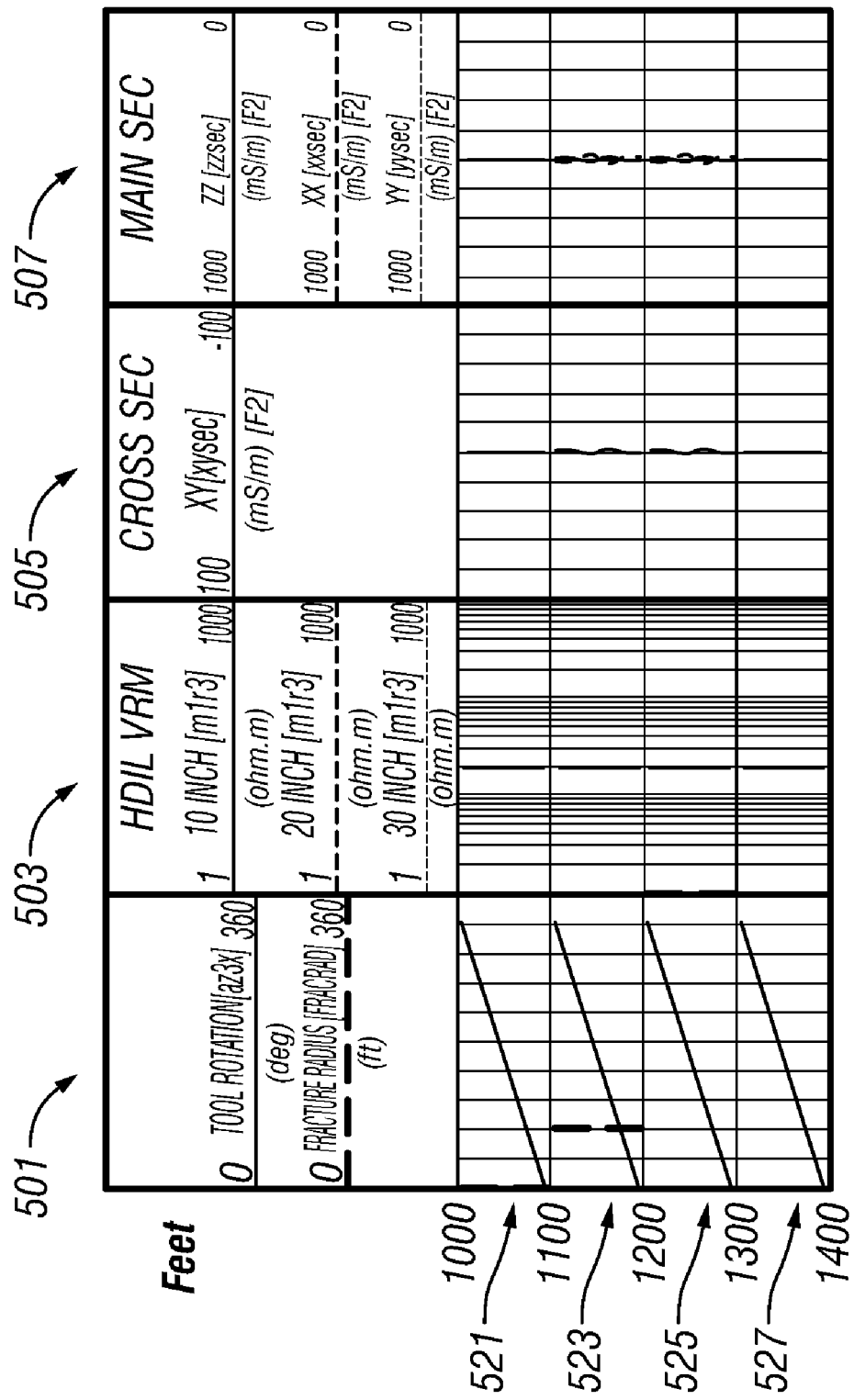
FIG. 8 illustrates HDIL and SEC 3DEX curves for a vertical conductive fracture.

Turning to conductive fractures, two different fracture resistivities are condisred in numerical simulations. In FIG. 8 presents the results (HDIL focused curves and 3DEX SEC curves) for a low resistivity contrast case in which an isotropic formation resistivity is 20 Ω-m and fracture and the mud resistivity is 1 Ω-m. Four cases are considered: 1000-1100 ft (segment 521)—no fracture; 1100-1200 ft (segment 523)—2-ft fracture; 1200-1300 ft (segment 52)—10-ft fracture; 1300-1400 ft (segment 527)—infinite fracture. Track 501 shows the rotation angle, track 503 is the HDIL response, track 505 is the XY component, while track 507 shows the XX, YY and ZZ components. One can see that the effect of the fracture is negligible on both HDIL and 3DEX responses: all curves read 20 Ω-m formation resistivity. We recall that this is the result for a single fracture with a 0.25" aperture. We may expect that the effects may be much stronger if the fractures are thicker (which is unlikely) and/or their density is much higher. The mud resistivity may be determined, for example, using the method and apparatus described in copending U.S. patent application Ser. No. 10/142,307

Figure 9:
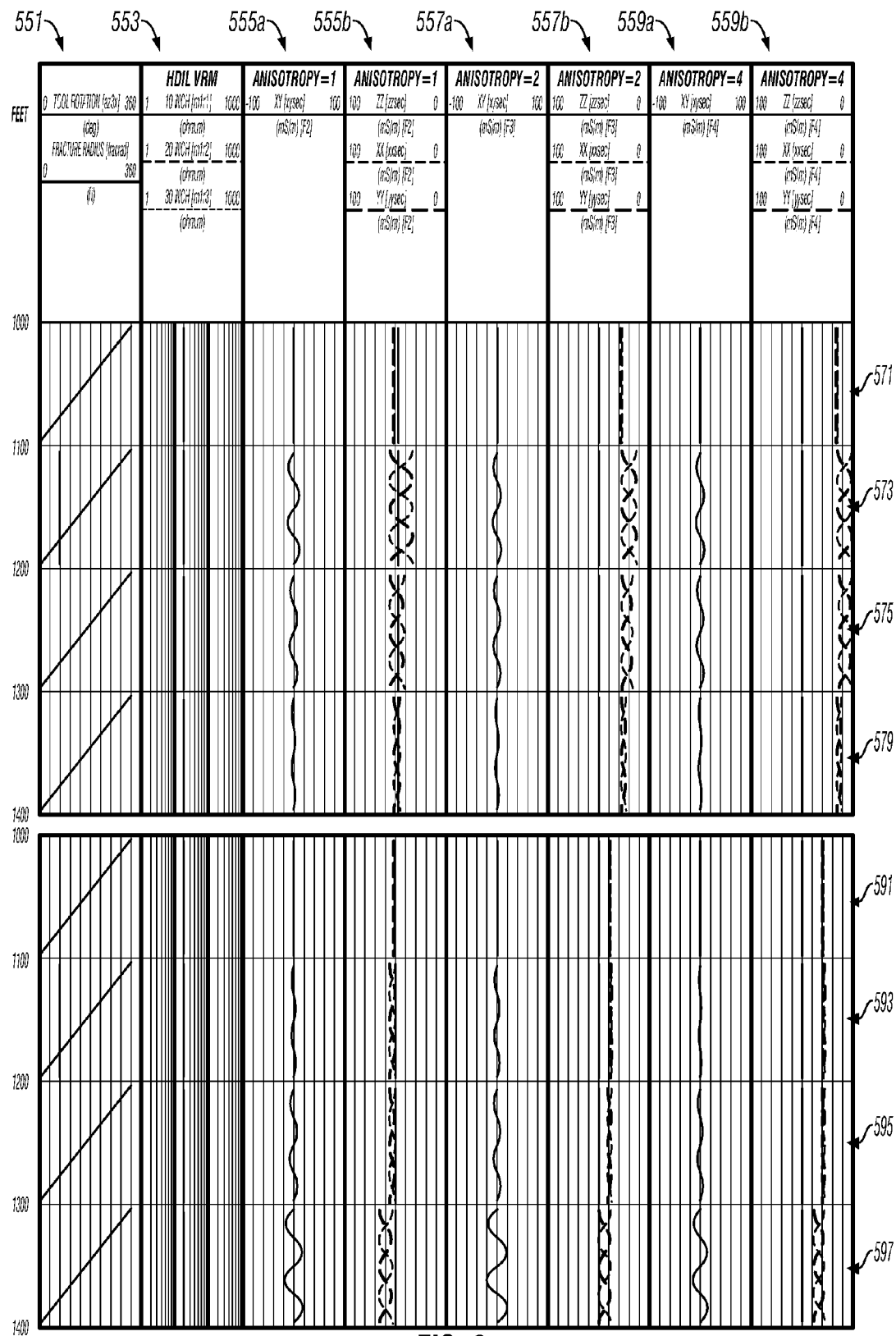
FIG. 9 illustrates HDIL and 3DEX curves for a vertical conductive fracture.

The results for a high resistivity contrast model in which the fracture and mud resistivity is 0.05 Ohm-m and the formation is 20 Ohm-m are depicted in FIG. 9. The SEC results are in panels 571, 573, 575 and 579 while the MFF curves are in 591, 593, 595 and 597. Track 553 shows the HDIL curves, while 555a, 55b are 3DEX curves for λ=1, 557a, 557b are 3DEX curves for λ=2, and 559a, 559b are 3DEX curves for λ=4. As expected, the HDIL focused curves show no effect of the fracture and accurately read the formation resistivity (all the curves overlay in the plot). Similar behavior is exhibited by the ZZ component of the 3DEX tool. The effects of the highly conductive fracture are noticeable on the 3DEX transversal components. The response of the YY component, which at zero rotation is parallel to the fracture plane, is quite intuitive. It is seen that due to the conductive fracture, it reads a slightly higher conductivity. At the same time the XX component at zero rotation (571) reads significantly lower conductivity for fractures 2- and 10-ft long. As noted above, this can be explained by a negative geometric factor of the vertical fracture. Surprisingly, the effect of the fracture disappears when the fracture becomes infinitely long. Review of the responses for different frequencies, it is noted that the effect of an infinite fracture disappears only at the low frequency limit, while at high frequencies the effect is actually very strong. Introducing higher vertical resistivity into the model almost proportionally reduces the reading of the transversal XX and YY component.

The MFF results (591, 593, 595, 597) for the high contrast model show that the MFF transformation significantly reduces the effect of shallow fractures. At the same time a much stronger effect is observed for the infinite fracture compared to the SEC responses (due to the effect at high frequencies). As we noted above, the MFF curves more naturally reflect the presence of the conductive fracture because they read higher conductivity of the formation. The presence of anisotropy in the model causes the readings of the XX and YY components to be smaller.

Figure 10:
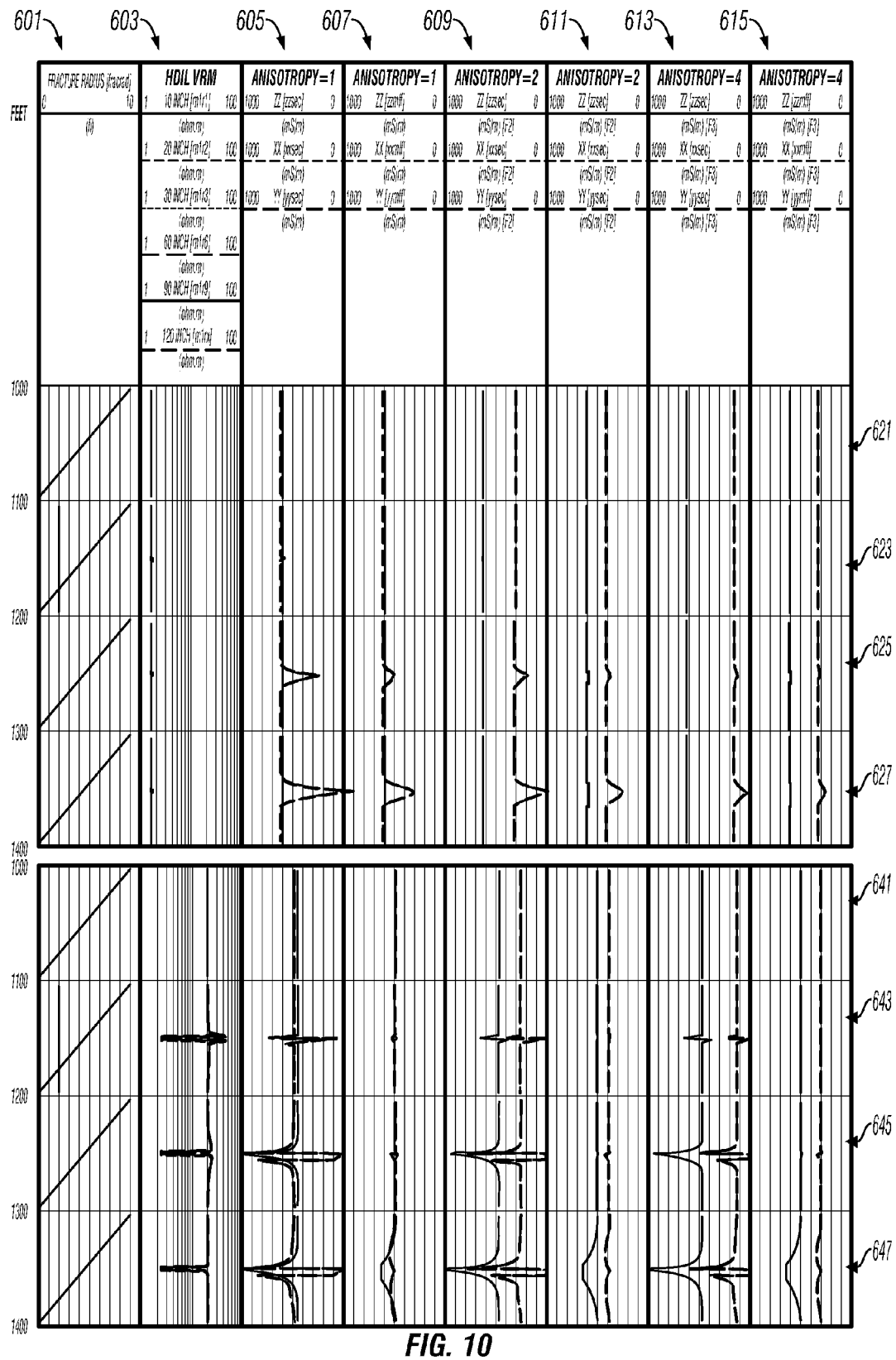
FIG. 10 illustrates HDIL and 3DEX (SEC and MFF) curves for horizontal fractures.

FIG. 10 shows the results of numerical simulation for horizontal fractures. The fracture is modeled as a 0.25-ft thick disk which is axially-symmetric with respect to the borehole and tool axis. As in the previous case, four different fracture radii are modeled: 0, 2, 10 ft and infinite (presented in track 601). The zero fracture radius is shown in 621 and 641, the 2 ft. fracture radius is shown in 623 and 643, the 10 ft. fracture radius is shown in 625 and 645, while the infinite horizontal fracture is in 627 and 647. Three values of formation anisotropy (1, 2, and 4) are shown. The disk is always located in the middle of a 100-ft interval. Because the model is axially-symmetrical, the XX and YY components are identical and all cross-components are equal to zero. Consequently, there is no point to model the rotating tool. Track 603 gives the focused array induction curves (they do not depend on anisotropy). Tracks 605, 609 and 613 are the SEC curves while tracks 607, 611 and 615 are the MFF curves.

The array induction responses show no effect from a resistive horizontal fracture (see track 603 for 621, 623, 625 and 627). This behavior was expected because the fracture aperture was below the tool resolution and its total conductance (the product of the fracture aperture and its conductivity) that affects a conventional induction tool, was close to zero.

A shallow 2-ft fracture also shows no effect on the multi-component XX and YY components. Observing quite a significant effect in the case of 10-ft and infinite fractures, it can be concluded that the depth of investigation of these components is much higher than 2 ft. A remarkable feature is the shape of the XX and YY responses, which resemble a typical vertical geometric factor for a 3-coil conventional ZZ array. The MFF transformation as well as the higher vertical resistivity (λ=2, 4) reduce the effects of the fracture. The model of the infinite resistive fracture can be considered also as a model of a thin resistive layer. If special measures are not taken to account for this resistive streak, the vertical resistivity within an interval of 10 ft above and 10 ft below will be significantly overestimated.

A very conductive horizontal fracture affects both multi-array and multi-component tools due to its high total conductance (see 641, 643, 645, 647). For all fracture lengths both tools indicate the presence of a thin conductive layer. In the case of a shallow 2-ft fracture, they also show some high-resistivity artifacts. The MFF transformation filters out the effects of the conductive horizontal fractures; even for a 10-ft fracture the effect is almost negligible.

As a summary, the table below shows whether or not the fracture effects can be observed in the tools' responses for all models considered.

TABLE 2

| Fracture type | | Fracture/Formation Resistivity (Ohm-m) | | | | |
|---|---|---|---|---|---|---|
| | L | 10000/1.6 | | 1/20 | | 0.05/20 |
| | ft | MA | MC | MA | MC | MA | MC |
| VF | 2 | Yes | Yes | No | No | No | Yes |
| | 10 | Yes | Yes | No | No | No | Yes |
| | Inf | Yes | Yes | No | No | No | Yes |

TABLE 2-continued

| Fracture type | | Fracture/Formation Resistivity (Ohm-m) | | | | | |
|---|---|---|---|---|---|---|---|
| | L | 10000/1.6 | | 1/20 | | 0.05/20 | |
| | ft | MA | MC | MA | MC | MA | MC |
| HF | 2 | No | No | No | No | Yes | Yes |
| | 10 | No | Yes | No | No | Yes | Yes |
| | Inf | No | Yes | No | No | Yes | Yes |

VF—vertical fracture;
HF—horizontal fracture;
MA—multi-array;
MC—multi-component tool The above table is for models with a single fracture. It is well known in the art that the effect of a plurality of aligned fractures is dependent upon an effective fracture density that is determined by the dimensions of the fractures and the average number of fractures per unit volume.

Next, the method of the present invention is illustrated using a data set from South Texas. The vertical well was drilled using an oil-based mud system with a 8.5-in bit size. A caliper curve indicates the relatively good condition of the borehole wall with a few intervals of rugosity and mud cake. The logging string included both HDIL and 3DEX tools and was rotating in the well with a speed reaching in some intervals one revolution per 80 ft.

Figure 11A:
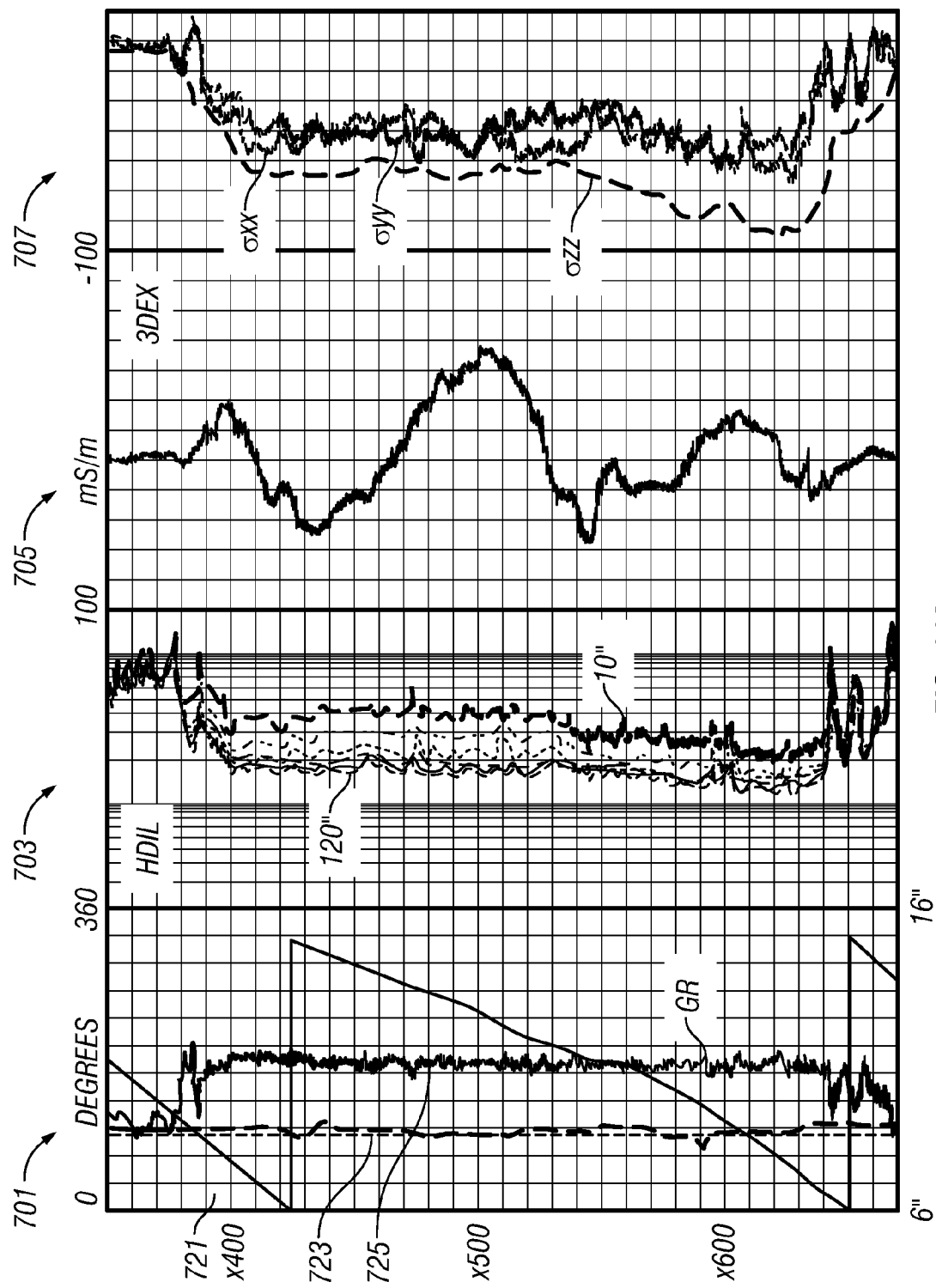
FIGS. 11a and 11b show HDIL and 3DEX curves for the South Texas well.
Figure 11B:
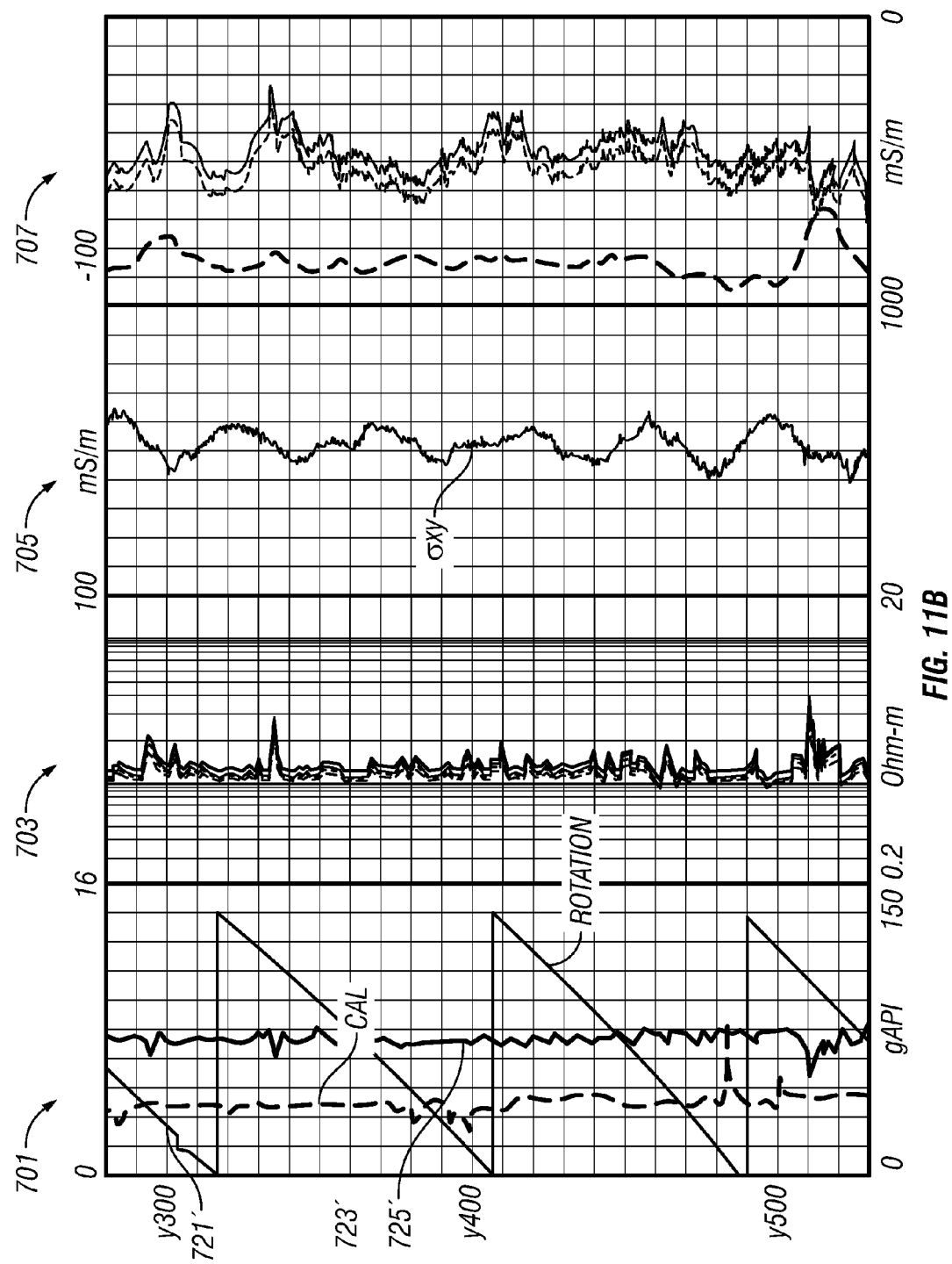

FIG. 11 shows the HDIL and 3DEX responses in two massive shale intervals: one from x380 to x640 ft and the second one from y270 to y540. Observing the GR curve that reads approximately 75 GAPI in both intervals, one might assume that these two massive shales have the same properties. However, analysis of the induction tool responses indicates that these shales are different. The HDIL curves separate in the upper interval showing a typical resistive invasion profile (shallow curves read higher resistivity), while in the lower interval they all overlay. Also, the deep resistivity curve reads about 1.6 Ω-m in the X interval and close to 1 Ω-m in the lower interval. In the upper interval, the XX and YY components of the 3DEX tool show a difference that changes accordingly with the rotation angle, while in the lower interval the XX and YY components are basically identical. Further, it can be seen that the XY component reads up to 80 mS/m in the upper interval and only 20 mS/m in the lower interval.

Based on these observations and the discussion above of induction tool responses in fractured formations, one can reliably conclude that the upper shale was fractured during the drilling process. Moreover, considering the modeling results discussed in the previous section (FIG. 6), we can determine the fracture parameters. Separation of the HDIL curves we observe in the real data agrees with the modeling results for the 2-ft fracture radius. The maximum of the XX component and zero crossing of the XY cross-component indicate an approximate orientation of the fracture plane to be 40° East of North.

Figure 12:
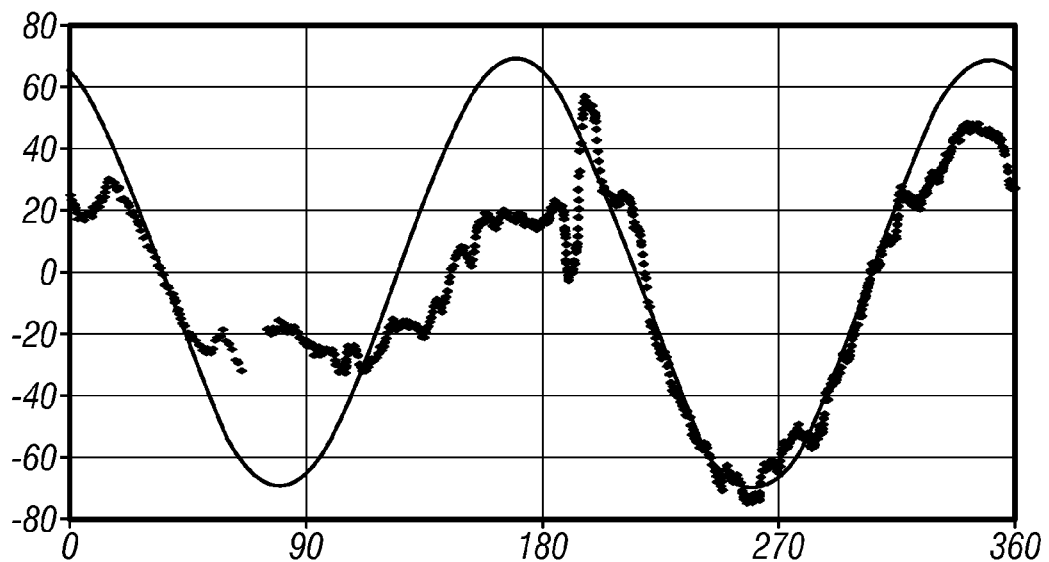
FIG. 12 shows results of numerical analysis of the XY component for the orientation of drilling-induced fractures.

FIG. 12 we present a statistical analysis of the XY measurements in the upper interval. Often individual measurements do not allow for accurate determination of fracture orientation due to the low signal-to-noise ratio or rapid changes in formation properties that can shift the maximums and zero-crossings of the curves. Plotting all the data as a function of the tool orientation still allows for determining fracture direction with an accuracy of a few degrees. In the presented example, the sinusoid used to approximate the XY data indicates that the minimum is at 80° and 260°, meaning that the orientation of the fractures is 35° East of North (80°-45°, see explanations above).

Figure 13:
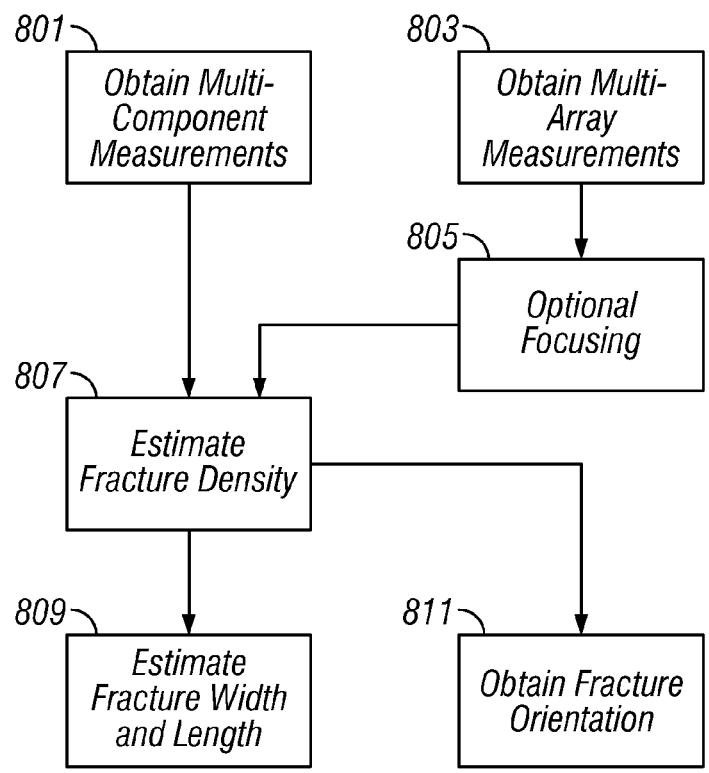
FIG. 13 is a flow chart summarizing some methods of the present disclosure.

FIG. 13 is a flow chart summarizing a method a method of the disclosure. Multi-component measurements are obtained 801 in an earth formation having fractures. This has been discussed above, for example, in paragraph 0018. The multicomponent measurements are processed 807 to obtain a density of the fractures in the earth formation. The measurements may be processed to obtain an indication of a length of the fracture (discussed in paragraph 0049), a length of the fracture (discussed in paragraphs 0040 and 0056 and with reference to FIG. 6), an orientation of the fracture (discussed in paragraph 0043 and with reference to FIG. 12). Multi-affay measurements may be made 803 and used in the determination of the fracture density 807. This has been discussed above in paragraph 0057 and table 2. Optionally, multifrequency focusing of the multi-away measurements may be done 805. The use of multifrequency focusing is discussed in paragraph 0046. The length of the fracture may be determined from multi-array measurements made at different transmitter-receiver distances 809. This has been discussed with reference to FIG. 6, FIG. 7 and paragraph 0037. As discussed with reference to FIG. 6 and FIG. 7, the fracture may be resistive. As discussed with reference to FIG. 8, FIG. 9 and in paragraphs 0041 and 0049, the fracture may be conductive. As discussed in paragraph 0043 and with reference to FIG. 12, the fracture orientation may be obtained from the multicomponent measurements. Determination of the orientation may be done using one or more of (i) a $H_{xx}$ component, (ii) a $H_{yy}$ component, and, (iii) a $H_{xy}$ component, discussed with reference to FIG. 10. As discussed with reference to FIG. 6, the fracture plane may be parallel to the borehole axis. The fracture plane may also be perpendicular to the borehole axis as discussed with reference to FIG. 10. The medium may be anisotropic and a difference between vertical and horizontal resistivity estimated as discussed in paragraph 0047.

Some or all of the processing may be done by a downhole processor, a processor at the surface, or a processor at a remote location. Implicit in the control and processing of the data is the use of a computer program on a suitable machine readable medium that enables the processor to perform the control and processing. The machine readable medium may include ROMs, EPROMs, EEPROMs, Flash Memories and Optical disks. The invention may also be implemented in conjunction with a measurement-while-drilling arrangement in which the multicomponent and multiarray measurements are made using a suitable device on a bottomhole assembly conveyed on a drilling tubular such as a drillstring.

While the foregoing disclosure is directed to the preferred embodiments of the invention, various modifications will be apparent to those skilled in the art. It is intended that all variations within the scope of the appended claims be embraced by the foregoing disclosure.

What is claimed is:

1. A method of determining a property of an earth formation having-at least one fracture therein, the method comprising:
   (a) making multicomponent resistivity measurements in a borehole in said earth formation, the multicomponent measurements responsive to at least one fracture;
   (b) using only the multicomponent resistivity measurements to obtain an estimate of an azimuthal orientation of the at least one fracture in the earth formation;
   (c) recording the estimated orientation of the at least one fracture on a suitable medium.

2. The method of claim 1 further comprising processing the multicomponent resistivity measurements to obtain an indication of at least one of
   (i) a width of a fracture, and (ii) a length of a fracture.

3. The method of claim 2 further comprising:
   (i) obtaining multiarray resistivity measurements in the borehole and
   (ii) using said multiarray measurements in said obtaining said indication.

4. The method of claim 3 comprising determining a length of a fracture by comparing the multiarray measurements made at different transmitter-receiver distances.

5. The method of claim 1 wherein a plane of at least one fracture is substantially parallel to an axis of the borehole.

6. The method of claim 1 wherein
   (i) said the formation has a vertical resistivity different from a horizontal resistivity,
   (ii) a plane of at least one fracture is substantially parallel to an axis of the borehole, and
   (iii) at least one fracture contains a fluid with a resistivity higher than a resistivity of the earth formation,
the method further comprising estimating a difference between the horizontal and the vertical resistivity.

7. A method of determining a property of an earth formation having a fracture therein, the earth formation having a vertical resistivity different from a horizontal resistivity, the method comprising:
   (a) obtaining multicomponent resistivity measurements in a borehole in the earth formation,
   (b) using only said the multicomponent measurements to estimate a value of the horizontal resistivity and vertical resistivity, the estimated values being substantially unaffected by the fracture; and
   (c) recording the estimated horizontal and vertical resistivities on a suitable medium.

8. The method of claim 7 wherein the multicomponent measurements comprise measurements at a plurality of frequencies, the method further comprising applying a multifrequency focusing.

9. The method of claim 7 further comprise selecting a subset of said multicomponent measurements comprising a current flow substantially parallel to a plane of the fracture.

10. The method of claim 7 further comprising:
    (i) obtaining a measurement indicative of an orientation of a device used for making the multicomponent measurements.

11. The method of claim 7 wherein a fluid in the fracture has a higher resistivity than a resistivity of the earth formation.

12. The method of claim 7 wherein a fluid in the fracture has a lower resistivity than a resistivity of the earth formation.

13. An apparatus for determining a property of an earth formation having a fracture therein, the apparatus comprising:
    (a) a device configured to make multicomponent resistivity measurements when conveyed in a borehole in the earth formation,
    (b) a processor configured to:
        (A) estimate from the multicomponent measurements an azimuthal orientation of the fracture, the determination being made using only the multicomponent measurements; and
        (B) record the estimated orientation on a suitable medium.

14. The apparatus of claim 13 wherein the processor is further configured to determine from the multicomponent measurements a width of the fracture.

15. The apparatus of claim 13 further comprising a multiarray resistivity device and wherein said processor is further configured to use measurements made by the multiarray resistivity device a length of the fracture.

16. The apparatus of claim 15 wherein the processor is configured to determine a length of the fracture by comparing measurements made by the multiarray resistivity device at at least two different transmitter-receiver spacings.

17. The apparatus claim 13 wherein the processor is further configured to apply a skin effect correction to the multicomponent measurements.

18. The apparatus of claim 13 further comprising an orientation sensor configured to obtain an orientation of the device used for making the multicomponent measurements.

19. The apparatus of claim 18 wherein the orientation sensor comprises at least one of (i) a magnetometer, (ii) an accelerometer, and (iii) a gyroscope.

20. The apparatus of claim 13 wherein the fracture is substantially parallel to an axis of said borehole.

21. The apparatus of claim 13 further comprising a wireline configured to convey the device which makes multicomponent measurements into the borehole.

22. The apparatus of claim 13 wherein
    (i) the earth formation has a vertical resistivity different from a horizontal resistivity,
    (ii) the fracture is substantially parallel to an axis of said borehole, and
    (iii) the fracture contains a fluid with a resistivity higher than a resistivity of said earth formation,
and wherein said processor is further configured to estimate a difference between said horizontal and said vertical resistivity.

23. An apparatus for determining a property of an earth formation having a fracture therein, the earth formation having a vertical resistivity different from a horizontal resistivity, the apparatus comprising:
    (a) a device configured to make multicomponent resistivity measurements when conveyed in a borehole in the earth formation,
    (b) a processor configured to:
        (A) estimate from the multicomponent measurements values of the horizontal resistivity and vertical resistivity using only the multicomponent resistivity measurements, the estimated values being substantially unaffected by the fracture, and
        (B) record the estimated horizontal resistivity and vertical resistivity on a suitable medium.

24. The apparatus of claim 23 wherein the device is configured to be operated at a plurality of frequencies, and wherein the processor is further-configured to apply a multifrequency focusing.

25. The apparatus of claim 23 wherein said processor is further configured to select a subset of the multicomponent measurements corresponding to a current flow parallel to a plane of said fracture.

26. The apparatus of claim 23 further comprising an orientation sensor configured to obtain an orientation of the device in said borehole;
and wherein said processor is configured to rotate the multicomponent measurements using the measured orientation.

27. The apparatus of claim 26 further comprising a wireline configured to convey the device into the borehole.

28. A computer readable medium for use with:
(a) a device configured to make:
multicomponent resistivity measurements in a borehole in an earth formation having a fracture therein;
the medium comprising instructions which enable a processor to:
(b) estimate an orientation of the fracture using only the multicomponent resistivity measurements; and
(c) record be estimated length and orientation on a suitable medium.

29. The computer readable medium of claim 28 wherein the instructions further enable a processor to estimate a vertical resistivity different from a horizontal resistivity.

30. The method of claim 1 wherein the multicomponent measurements comprise $H_{xx}$ and $H_{yy}$ measurements, and at least one of: (i) a $H_{xy}$ measurement, and (ii) a $H_{yx}$ measurement.

31. The method of claim 1 wherein obtaining the azimuthal orientation further comprises using a relation of the form:

$$\varphi = \frac{1}{2}\tan^{-1}\left(\frac{2H_{xy}}{H_{yy} - H_{xx}}\right),$$

where $\phi$ is the azimuthal orientation angle relative to an x-axis.

32. The method of claim 1 wherein obtaining the estimate of the azimuthal orientation further comprises applying a skin-effect connection to the data.

33. The method of claim 1 wherein the multicomponent resistivity measurements further comprise multifrequency measurements.

34. The method of claim 33 wherein obtaining the estimate further comprises performing a multifrequency focusing.

35. The method of claim 30 wherein obtaining the estimate further comprises identifying an extremum of at least one of: (I) a $H_{xx}$ measurement, (II) a $H_{yy}$ measurement, (III) a $H_{xy}$ measurement, and (IV) a $H_{yx}$ measurement.

* * * * *